INVENTORS
LYLE K. MATSON
FRANCIS J. REID
JAMES F. MILLER

BY *Gray, Mase & Dunson*

ATTORNEYS

INVENTORS
BY LYLE K. MATSON
FRANCIS J. REID
JAMES E. MILLER
Gray, Mase & Dunson
ATTORNEYS INVENTORS
LYLE K. MATSON
FRANCIS J. REID
JAMES F. MILLER
BY
Gray, Mase & Dunson
ATTORNEYS

RESISTANCE DEVICES

Filed Jan. 17, 1964 4 Sheets-Sheet 4

RARE-EARTH MONOTELLURIDES AND MONOSELENIDES

INVENTORS
LYLE K. MATSON
FRANCIS J. REID
JAMES F. MILLER

BY

Gray, Mase & Dunson

ATTORNEYS

United States Patent Office 3,270,310
Patented August 30, 1966

3,270,310

RESISTANCE DEVICES

Lyle K. Matson, Francis J. Reid, and James F. Miller, all of Columbus, Ohio, assignors to Battelle Memorial Institute, Columbus, Ohio, a corporation of Ohio Filed Jan. 17, 1964, Ser. No. 338,388
6 Claims. (Cl. 338—20)

This invention relates to materials for resistance devices. Using the materials of the present invention electrical resistors can be made to have any desired temperature coefficient of resistance over a wide range of values, both positive and negative. The materials may also be used in such proportion as to provide a temperature coefficient of resistance that is zero in electrical resistors.

In many electrical and electronic circuits it is necessary that the resistors hold tolerances within narrow limits. Examples are those used (1) as dropping resistors to adjust voltages precisely, (2) as the resistive components in finely tuned resonant circuits, (3) as components in resistance-coupled amplifiers (e.g., in logic nets or telemetering systems). In some of these applications it may be desirable to preselect the temperature coefficient of resistance of the resistor so as to just compensate for the effects of temperature changes on other components of the circuit. In others, it may be desirable that the resistor have a zero temperature coefficient of resistance over the range of operating temperatures so that temperature changes will not adversely affect the function of the resistor in the circuit.

The present invention fulfills the need for improved resistors as discussed above by making use of a group of new electronic conductor materials that make it possible to provide a wide range of values of the temperature coefficient of resistance as well as a wide range of resistivities at a given temperature, as the drawings illustrate.

Figure 5:
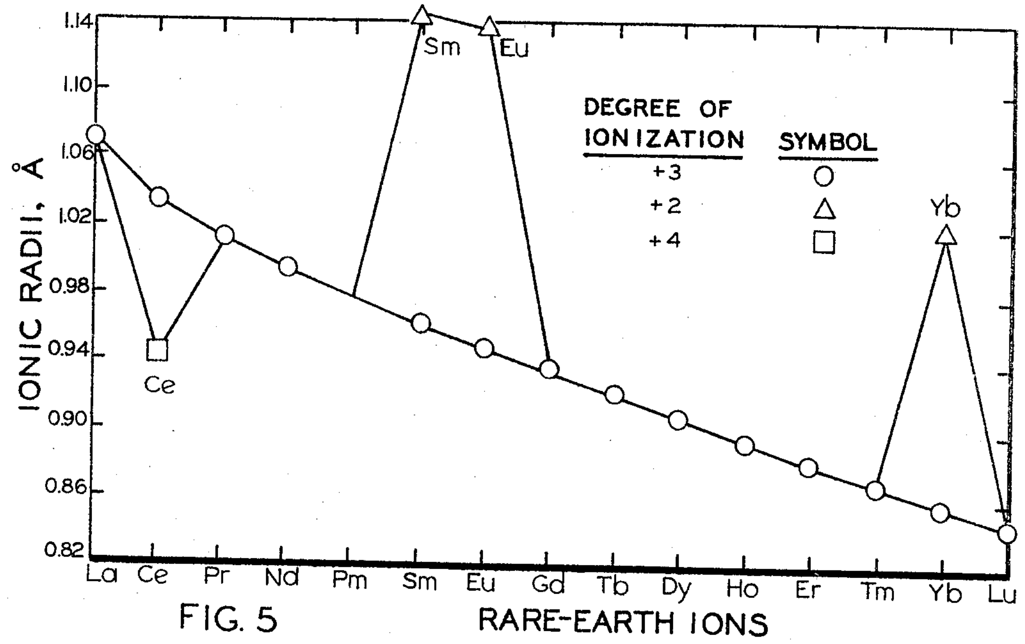

FIG. 5 is a graphic plot of the ionic radii of the ions of the rare-earth elements 57–71; La, Ce, Pr . . . Yb, Lu.

Figure 6:
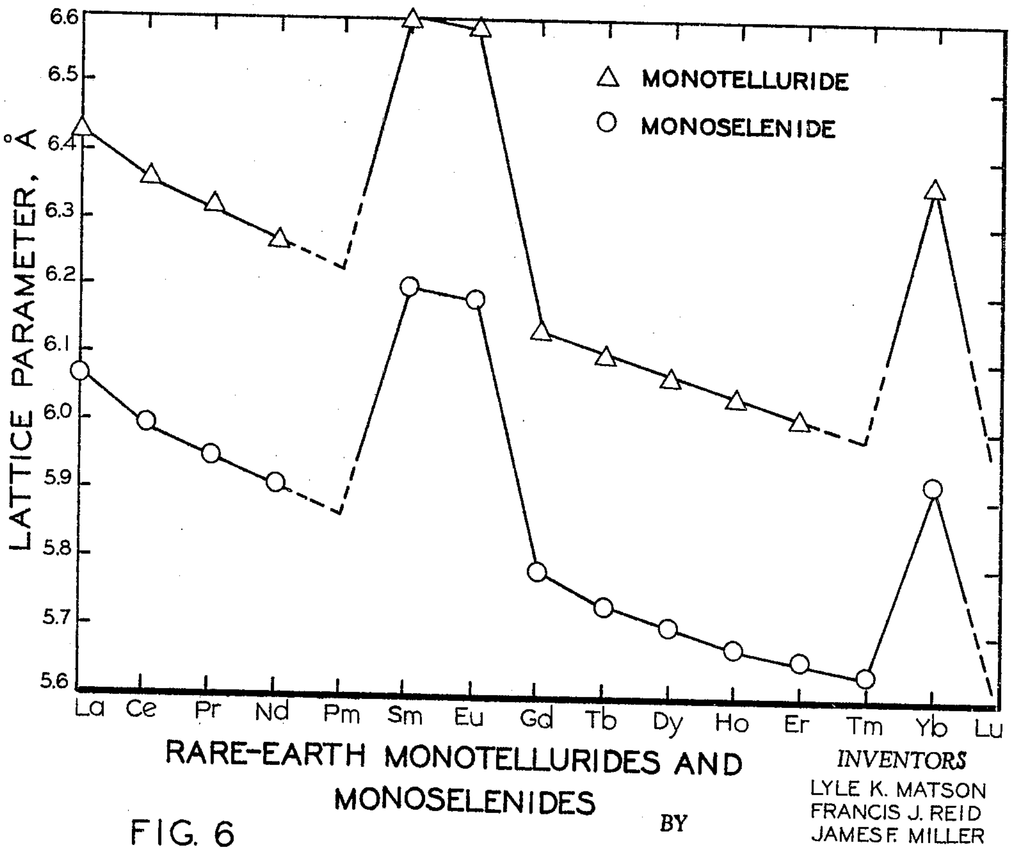

FIG. 6 is a graphic plot of the lattice parameters, which are given as the lengths of the unit cells along a major axis of the face centered cubic, sodium chloride type structure, of the monotellurides and monoselenides of the rare-earth elements 57–71; La, Ce, Pr . . . Yb, Lu.

Figure 7:
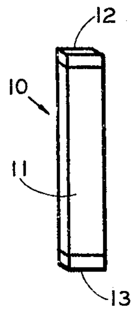

FIG. 7 is a perspective view of a typical resistance device according to the present invention.

A resistance device according to this invention comprises a crystalline body and electrical connecting means in contact therewith, the body comprising essentially at least one compound containing substantially equal atomic proportions of a rare-earth element that exhibits predominantly a stable tripositive oxidation state (type III) and an element of the second subgroup of Group VI of the Periodic System. Included are compounds such as the monotellurides, monoselenides, monosulfides, and monoxides of scandium, yttrium, lanthanum, cerium, praeseodymium, neodymium, gadolinium, terbium, holmium, dysprosium, erbium, thulium, and lutetium.

Any additional ingredient of the resistance material consists essentially of at least one compound containing substantially equal atomic proportions of a rare-earth element that normally exhibits a stable dipositive oxidation state (type II) and an element of the second subgroup of Group VI of the Periodic System. Included are compounds such as the monotellurides, monoselenides, monosulfides, and monoxides of samarium, europium, and ytterbium.

The resistance material may be in the form of either a bulk crystal or a thin film. Natural mixtures of the rare-earth elements may be used in the resistance materials for convenience and economy, thus avoiding unnecessary purification steps. Rare-earth elements that do not occur together naturally may also be mixed, to adjust not only the temperature coefficient of resistance but also the level of the specific resistance. Complex alloys of natural or artificial mixtures may also be made to provide the desired properties.

Figure 1:
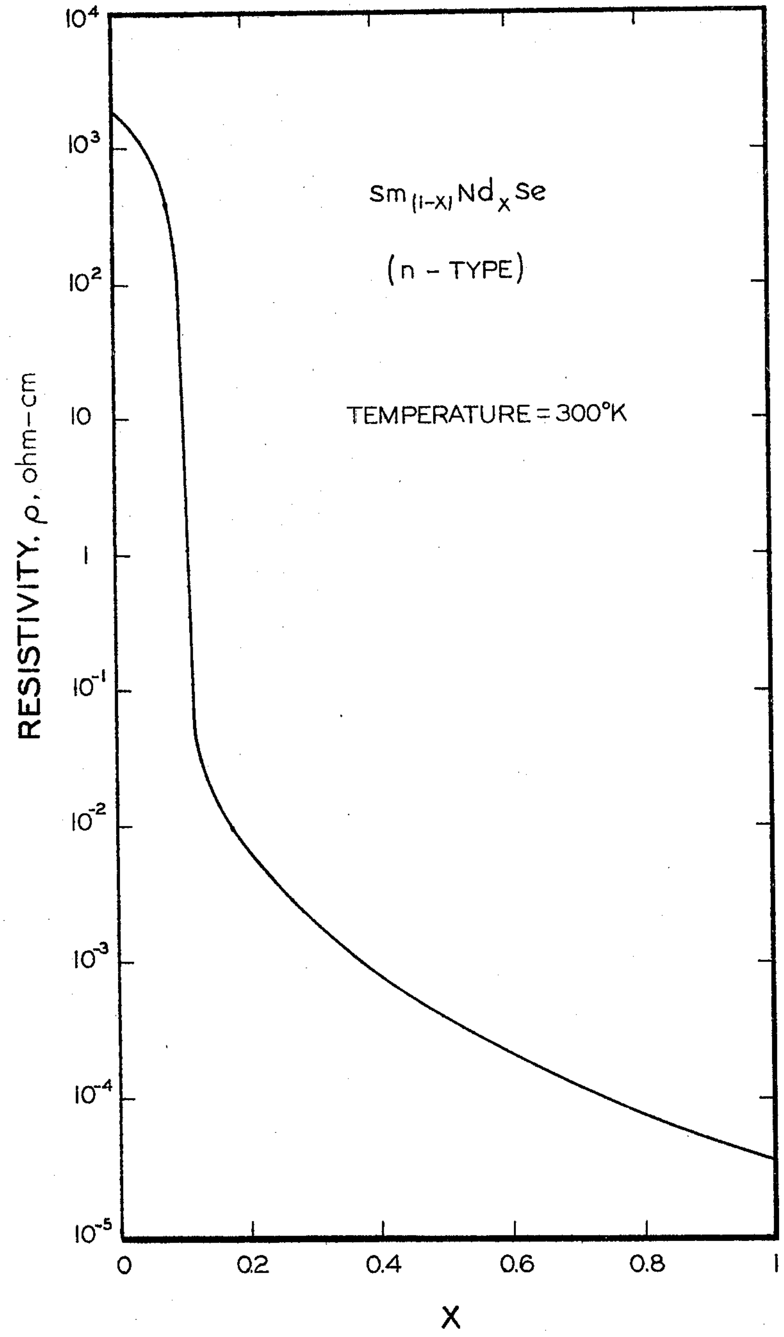
FIG. 1 is a graph on semilogarithmic coordinates of measured resistivity at 300° K. as a function of composition in alloys of samarium selenide and neodymium selenide.

It has been found as a part of the present invention that the resistivities of alloys of the type III and type II rare-earth compounds described above vary with composition in a manner illustrated in FIG. 1, which shows the resistivity at room temperature of the alloys of samarium selenide and neodymium selenide. The typical behavior is illustrated by this system, in which samarium is the type II rare-earth metal and neodymium is the type III metal. As the type II rare-earth metal, samarium, is progressively replaced with the type III rare-earth metal, neodymium, the electrical resistivity of the alloy decreases a number of orders of magnitude. As FIG. 1 illustrates, the decrease is not linear with composition, but drops precipitously through several orders of magnitude within a narrow composition range near 11 to 13 mole percent NdSe.

Figures 2, 3:
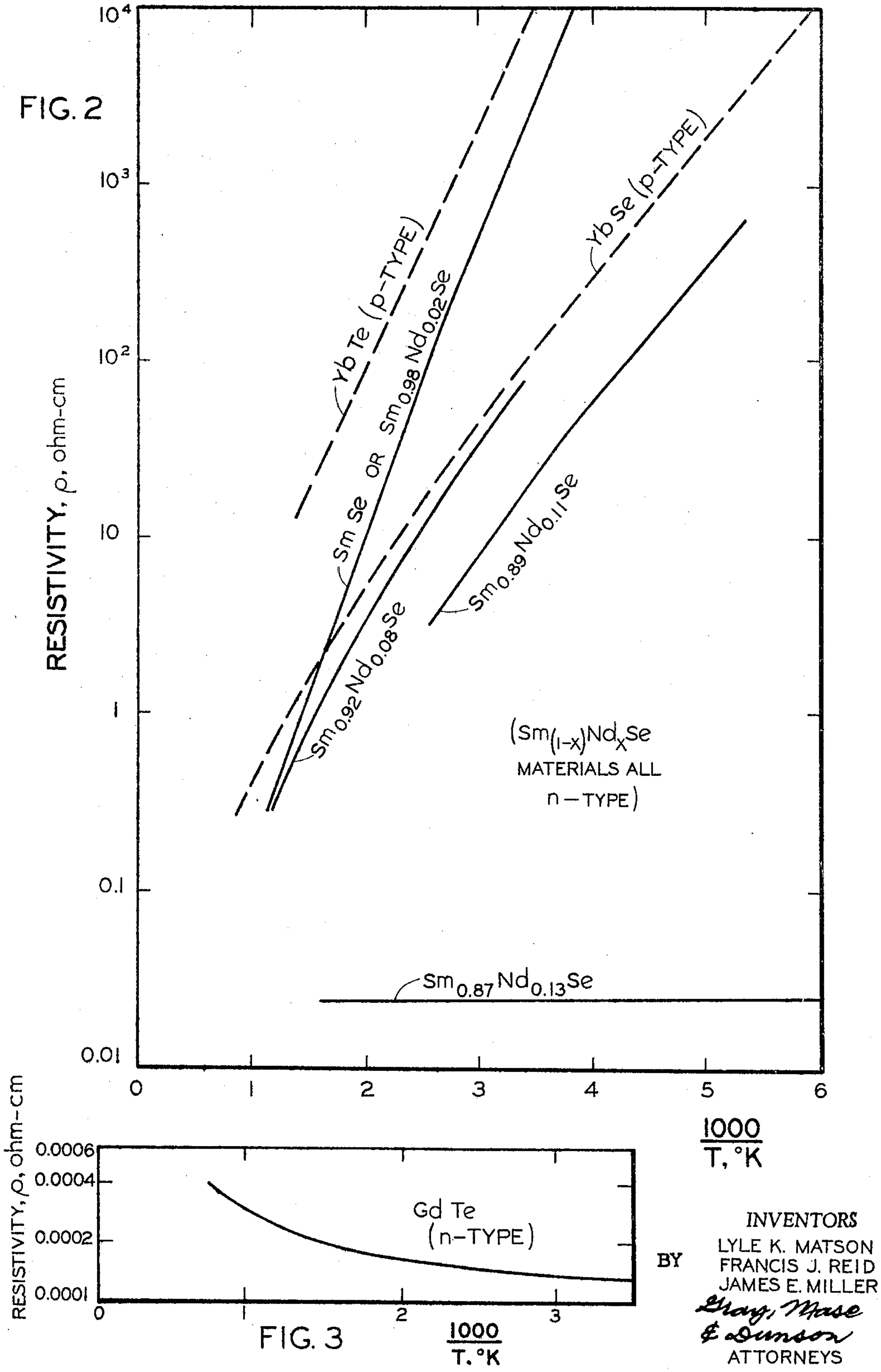
FIG. 2 is a graph on semilogarithmic coordinates of measured resistivity as a function of the reciprocal of temperature for several materials used in the present invention.
FIG. 3 is a graph similar to FIG. 2 for gadolinium telluride.
Figure 4:
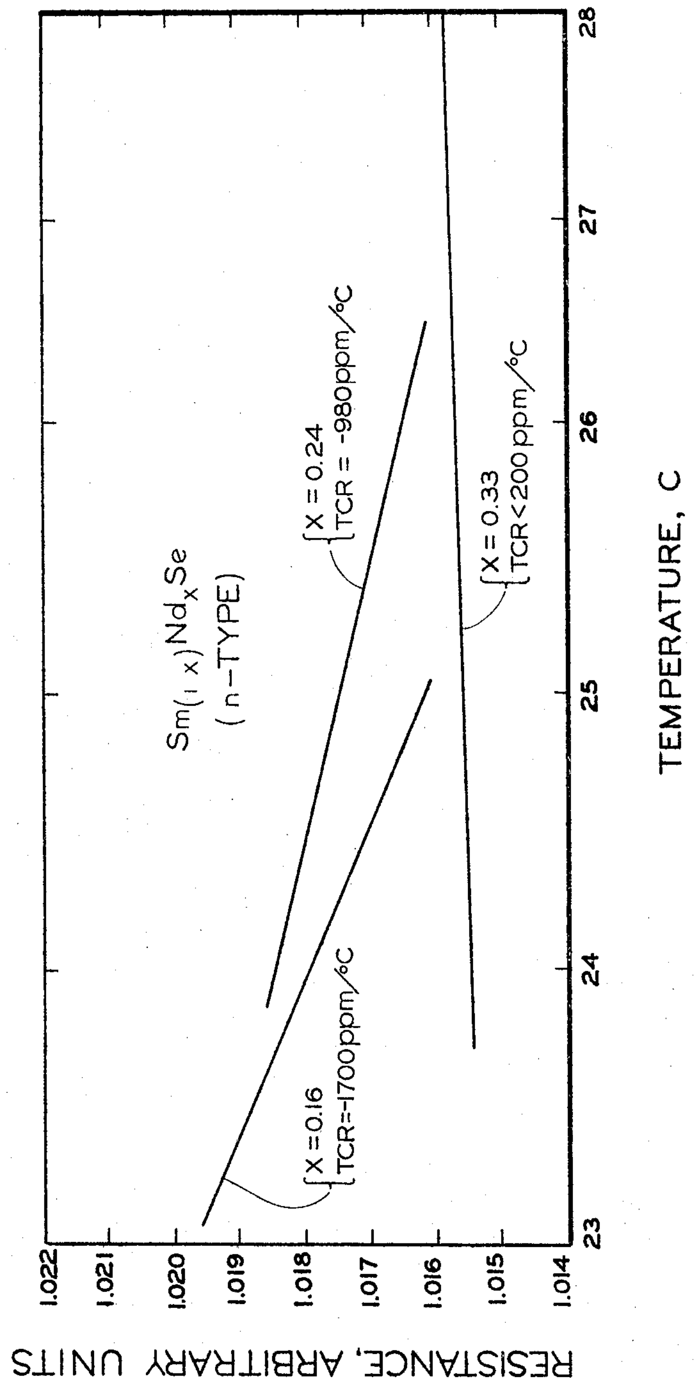
FIG. 4 is a graph on rectangular coordinates of resistance in arbitrary units as a function of temperature for three alloys of samarium selenide and neodymium selenide.

As is shown in FIG. 2, the temperature coefficients of resistance are negative for alloys near pure SmSe in composition, being quite large for pure SmSe and decreasing as the NdSe concentration is increased. The temperature coefficient of resistance (TCR) becomes positive as the NdSe concentration is increased further, moving toward the highest positive value at pure NdSe, and toward a resistivity versus temperature relationship similar to that shown for GdTe in FIG. 3. Hence, it is seen that alloy compositions can be obtained which exhibit (1) a negative TCR, (2) a positive TCR, and (3) a near-zero TCR over a relatively large temperature range. Thus, the magnitude of the temperature coefficient can be varied. For this particular alloy system the near-zero TCR is obtained with a composition in the range of 24 to 33 mole percent NdSe; as shown in FIG. 4, where the TCR is seen to change sign in this composition range. In addition, it is seen from FIG. 1 that the specific resistance at a given temperature can be adjusted through a considerable range of values.

The table below lists resistivities at various temperatures of other typical materials that may be used in resistance devices of this invention.

TABLE

| Material | Temperature, °K. | Resistivity, ρ, ohm-cm. |
|---|---|---|
| NdTe | 298<br>143 | $4.7\times10^{-4}$<br>$3.0\times10^{-5}$ |
| SmTe | 298<br>130 | $2.0\times10^{3}$<br>$10^{8}$ to $10^{9}$ |
| CeSe | 295<br>92 | $1.0\times10^{-4}$<br>$8.0\times10^{-5}$ |
| $Nd_{0.02}Yb_{0.98}Se$ | 309<br>254 | $1.1\times10^{4}$<br>$3.4\times10^{4}$ |
| $Nd_{0.08}Yb_{0.92}Se$ | ~300 | 140 |
| $Nd_{0.33}Yb_{0.67}Se$ | 303<br>93 | $9.4\times10^{-3}$<br>$1.2\times10^{-3}$ |

The compounds and alloys in the figures and in the above table are used merely as examples of the compounds and the simple and complex alloys included in the present invention.

From these examples it is obvious to those familiar with rare-earth chemistry and physics that all of the materials mentioned earlier in summarizing the invention can be used to obtain the properties described. As is indicated by the ion and unit-cell sizes in FIGS. 5 and 6, the essential requirements that (1) the type II element exists as the dipositive ion in the compounds, and (2) the type III element exists as the (smaller) tripositive ion, are met by the elements named. The dashed-line curves in FIG. 2 for ytterbium telluride and ytterbium selenide show that these materials can be used similarly to samarium selenide in alloys with the type III compounds. In addition, the similarity of the general physical characteristics and the general nature of the electrical properties exhibited by the tellurides, selenides, sulfides, and oxides within a given series of isostructural compounds of a given metallic element has been established in numerous studies. (See semicondutcors, ed. by N. B. Hannay, Reinhold Publishing Corp., New York, 1959; especially chapters 2, 13.) With the use of such compounds and alloys from the group mentioned above, it is apparent that the TCR and specific resistance or resistor devices can be varied over wide ranges of values.

The materials should be prepared in good purity as compact crystalline bodies, as by the direct reaction of the rare-earth metal in the form of granules, filings, or shavings with vapor of the metalloid at moderate temperatures (500–800° C.) and subsequent melting in a nonreactive container such as tantalum or molybdenum in an inert atmosphere such as argon or helium. By cooling the materials slowly with carefully controlled cooling rates and temperature gradients, it is possible to grow large crystals consistently, from which sizable single-crystal specimens can be obtained. However, this is not necessary to obtain good performance or reproducible results, since it has been discovered also that, in contrast to some other resistor materials, the electrical properties of these rare-earth compounds and alloys are not sensitive to normally encountered variations in purity or to the crystalline state of the materials. The resistivity versus temperature relationships that are observed appear to be intrinsic behavior for the materials, and identical characteristics are obtained with both single-crystal and polycrystalline material, and with specimens that differ considerably in purity (e.g., 99.97 to 99.994 percent pure with respect to detected foreign elements).

An additional advantage over other resistor materials is the excellent thermal stability of these materials. The melting points are high (in the range of 1700–2100° C.), and excursions to temperatures near 1000° C. (in vacuo) have been experienced without permanent effect upon the electrical properties. All of the materials crystallize in the face centered cubic NaCl structure. Thus no crystalline phase change is encountered to affect the stability of the compounds and the alloys as their compositions are adjusted to predetermine resistivity and TCR; or as the materials are subjected to temperature excursions during operation of the devices in which they are used.

Referring now to FIG. 7, a typical resistance device 10 according to the present invention comprises a body 11 made of a crystalline material, either in bulk form or in the form of a thin film, comprising essentially at least one compound containing substantially equal atomic proportions of a rare-earth element that exhibits predominantly a stable tripositive oxidation state (type III) and an element of the second subgroup of Group VI of the Periodic System; any additional ingredient therein consisting essentially of at least one compound containing substantially equal atomic proportions of a rare-earth element that normally exhibits a stable dipositive oxidation state (type II) and an element of the second subgroup of Group VI of the Periodic System. A conductor 12 made of any suitable metal or other electrically conductive material is connected to the upper surface of the body 11. A conductor 13 made of any suitable metal or other electrically conductive material is connected to the lower surface of the body 11.

To summarize, a preferred form of resistance device according to this invention comprises a crystalline body (the term "crystalline body" including the crystalline thin-film form) and electrical connecting means in contact therewith, the body comprising essentially at least one material of the group consisting of the monotellurides, monoselenides, monosulfides, and monoxides of scandium, yttrium, lanthanum, cerium, praesodymium, neodymium, gadolinium, terbium, holmium, dysprosium, erbium, thulium, and lutetium, preferably in a concentration of at least about 5 mole percent; and any additional ingredients thereof consisting essentially of at least one material of the group consisting of the monotellurides, monoselenides, monosulfides, and monoxides of samarium, europium, and ytterbium.

The resistance devices of the present invention provide a wide range of resistivities and of temperature coefficients of resistance. They can be made to have specific characteristics within close tolerances and with excellent thermal stability to very high temperatures.

What is claimed is:

1. A resistance device comprising a crystalline body and electrical connecting means in contact therewith, said body consisting essentially of at least one material of the group consisting of the monotellurides, monoselenides, monosulfides, and monoxides of scandium, yttrium, lanthanum, cerium, praeseodymium, neodymium, gadolinium, terbium, holmium, dysprosium, erbium, thulium, and lutetium; and at least one material of the group consisting of the monotellurides, monoselendies, monosulfides, and monoxides of samarium, europium, and ytterbium.

2. A resistance device according to claim 1, said body consisting essentially of a compound of samarium and a compound of neodymium.

3. A resistance device according to claim 1, said body consisting essentially of a compound of ytterbium and a compound of neodymium.

4. A resistance device according to claim 1, said body consisting essentially of samarium selenide and neodymium selenide.

5. A resistance device according to claim 1, said body consisting essentially of 5 to 95 mole percent samarium selenide and the balance neodymium selenide.

6. A resistance device according to claim 1, said body consisting essentially of ytterbium selenide and neodymium selenide.

References Cited by the Examiner

UNITED STATES PATENTS

| | | | |
|---|---|---|---|
| 2,976,505 | 3/1961 | Ichikawa | 338—22 |
| 2,978,661 | 4/1961 | Miller et al. | 338—22 |
| 3,044,968 | 7/1962 | Ichikawa | 338—22 X |

RICHARD M. WOOD, *Primary Examiner.*

W. D. BROOKS, *Assistant Examiner.*

Dedication 3,270,310.—*Lyle K. Matson*, *Frances J. Reid*, and *James F. Miller*, Columbus, Ohio. RESISTANCE DEVICES. Patent dated Aug. 30, 1966. Dedication filed May 7, 1973, by the assignee, *The Battelle Development Corporation*.

Hereby dedicates to the People of the United States the entire remaining term of said patent.

[*Official Gazette October 30, 1973.*]